United States Patent [19]
Ruozi

[11] Patent Number: 6,039,991
[45] Date of Patent: Mar. 21, 2000

[54] METHOD AND APPARATUS FOR SANITIZING MINCED MEAT

[76] Inventor: Giuseppe Ruozi, 42100 Reggio Emilia, Viale Timavo, 17, Italy

[21] Appl. No.: 09/205,117

[22] Filed: Dec. 3, 1998

[30] Foreign Application Priority Data

Jul. 1, 1998 [IT] Italy ................................. MO98A0144

[51] Int. Cl.⁷ ................................. A21D 6/00; H05B 6/80
[52] U.S. Cl. ............................. 426/241; 426/646; 99/451; 99/483; 219/731
[58] Field of Search ..................................... 426/236, 237, 426/241, 646; 99/451, 483; 219/731

[56] References Cited

U.S. PATENT DOCUMENTS

| | | | |
|---|---|---|---|
| 4,624,854 | 11/1986 | Naumann et al. | 426/233 |
| 4,687,895 | 8/1987 | Chitre et al. | 219/10.55 |
| 4,808,782 | 2/1989 | Nakagawa et al. | 219/10.55 |
| 4,808,783 | 2/1989 | Stenstrom | 219/10.55 |
| 4,919,951 | 4/1990 | Jensen et al. | 426/241 |
| 5,066,503 | 11/1991 | Ruozi | 426/234 |
| 5,472,723 | 12/1995 | Veronesi et al. | 426/302 |
| 5,919,506 | 7/1999 | Ruozzi | 426/241 |

*Primary Examiner*—Nina Bhat

[57] ABSTRACT

A method for sanitizing minced meat consisting in quickly heating the minced meat by microwave heating and hot air under a pressure increasing from atmospheric pressure to an overpressure which prevents liquid evaporation, in subsequent heating of the minced meat by microwave heating up to a sterilization temperature and under constant overpressure for preventing liquid evaporation, and in finally cooling the minced meat under a pressure gradually decreasing to the atmospheric pressure, with the sterilization temperature being maintained below a threshold temperature at which the meat changes organoleptic characteristics with respect to its raw meet state. The apparatus for sanitizing the minced meat has a first, a second and a third independently operatable stations for performing the microwave heating, pressurizing and cooling operations and microwave reflective conveyance elements for supporting the meat during advancement along advancement lines of the stations and which allow liquids to drip off the treated meat.

20 Claims, 2 Drawing Sheets

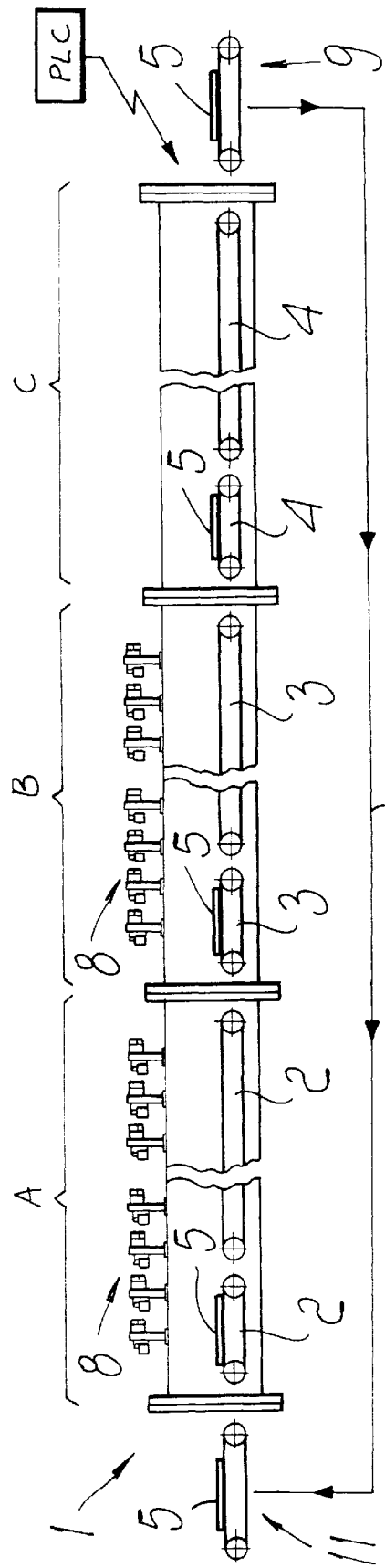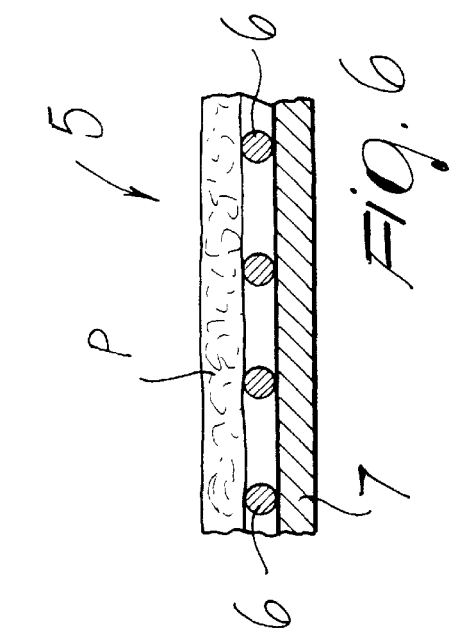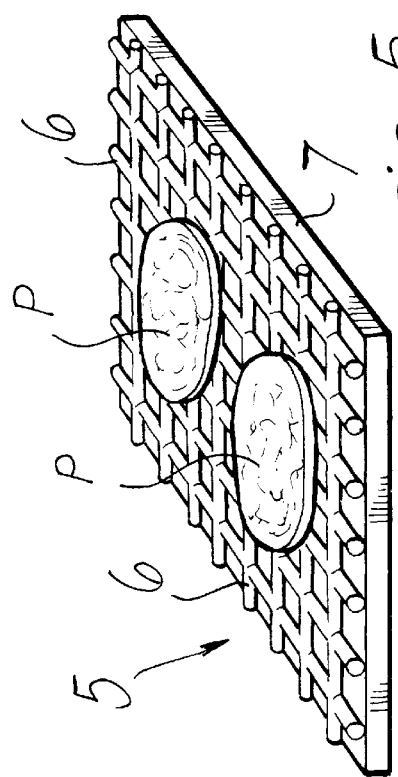

METHOD AND APPARATUS FOR SANITIZING MINCED MEAT

BACKGROUND OF THE INVENTION

1. Field of the Invention

The present invention relates to a method and an apparatus for sanitizing minced meat.

The term "minced meat" is understood to designate a product obtained from the mincing or grinding of meat from the forequarter of bovines, as specified by Directive 84/c 255/09 of the Council of the European Economic Community.

2. Description of the Prior Art

The mincing and reconstitution of meat in the form of "hamburgers" allows quick cooking and increases consumption considerably. However, during mincing, the meat undergoes a temperature increase which facilitates the development of bacteria, especially if strict and perfect cleaning of the mincer is not performed.

Minced meat has an extremely large surface exposed to the air; this causes the development of a brown color of the product due to the forming of oxymyoglobin and danger of microbial proliferation and contamination by germs in the environment and germs introduced by handling, tools, et cetera.

It is known that *E. coli* 0157:H7 has a growth temperature range of 7 to 50° C. with an optimum level around 37° C.

Other bacteria grow, in air, at temperatures in the range of 10–45° C., with an optimal growth interval at 30–40° C.

Accordingly, heating the meat produces an increase in the bacterial population which can raise its level to values dangerous for the consumer's health (*E. Coli* can cause gastroenteritis with complications involving the renal function in children and elderly people).

Although modern processing methods, with the use of meat at low temperature (around 0° C.), and laboratories conditioned at temperatures as low as −12° C. have reduced the drawbacks described above, the bacteria presence as reflected by the total plate count (TPC) is still rather high and causes accidents which are very dangerous and sometimes even fatal.

The fact that many countries have set limits for the microbiological acceptability of hamburgers in order to protect both the producer and the consumer demonstrates that the such a food product contamination is still a widespread problem.

To prevent these contaminations, it is known in the art to subject the food products to a heat treatment, such as pasteurization or sterilization and subsequently to deep-freezing and/or to vacuum/aseptic packing. It is usually used the so-called HTST-process (High Temperature Short Time), i.e. heat treatment at high temperature for a short time (see U.S. Pat. No. 5,374,437). The HTST technique is known to limitedly affect the taste quality of a treated food product. However, it only acts at the surface of the product while still producing an organoleptic degradation thereof which consists in a changing of its colour, i.e. the meat has no longer the fresh, raw meat, red colour. This creates the impression of a product which is no longer in the fresh state and, as such, is not appreciated by the consumer.

Moreover, the inner parts of the product are not treated adequately, and this is critical especially in the case of minced meat.

Also known is the use of the ionizing radiation, which sterilizes the meat while keeping it red; however, such radiation is believed to be mutagenic and therefor can cause health problems. Legislation in many countries, in fact, requires to specify on the product if it was treated by ionizing radiations. All this was also seen to negatively influence the consumer at least in that it led to important drops in the consumption of the so treated food products.

Studies have been undertaken to determine the destruction of *Escherichia coli* 0157:H7 in food systems by microwaves, which are known to heat the inner parts of a product (Czechowitz, S. M., Thesis publ. 1996, University of Minnesota, St. Paul, USA.). It was established that heating of ground beef patties at 67.8° C. in microwave ovens would destroy *E. coli*. Power levels of microwave ovens were also found to be critical to bacteria lethality (Czechowitz, S. M. and Zottola, E. A.—Institute of Food Technologists, U.S.A. 1996 Annual Meeting).

Attempts have been also made to achieve a heat treatment of the products by subjecting them to controlled heating by microwaves and/or other heating means with the purpose of obtaining, as much as possible, a uniform heating of the whole treated mass (U.S. Pat. Nos. 3,494,723; 3,494,724; 3,809,844; 3,814,889; and 5,308,629)

The disclosed methods and systems, however appear not to be entirely satisfactory being either complicated, adapted for products with limited thickness, not entirely efficient for assuring a uniform temperature all throughout the treatment mass, and eventually conducting to unsuitable and easily perceivable oraganoleptic changes of the treated food product.

Moreover the products treated in accordance with the known methods may undergo significant weight reduction due to water evaporation and fat melting, which is generally commercially unprofitable.

SUMMARY OF THE INVENTION

The aim of the present invention is to obviate the above drawbacks by providing a method for sanitizing minced meat and a corresponding apparatus which allow to avoid organoleptic degradation, in particular a colour changing, a significant weight loss of the product, and ensure effective sanitization thereof in a relatively short time.

Within the scope of this aim, an object of the present invention is to achieve said aim with a method and an apparatus which are simple, relatively easy to provide in practice, highly safe and reliable in use, effective in operation and relatively modest in cost.

This aim and this object are achieved by a method, according to the invention, for sanitizing minced meat, comprising a quickly heating of the minced meat by microwave heating and hot air under a pressure increasing from atmospheric pressure to an overpressure which prevents liquid evaporation, a further heating of the minced meat by microwave heating up to a sterilization temperature and under constant overpressure for preventing liquid evaporation, and a cooling of the minced meat under a pressure gradually decreasing to the atmospheric pressure, wherein the sterilization temperature is below a threshold temperature at which the meat changes organoleptic characteristics with respect to the raw meat state thereof.

An apparatus for sanitizing raw minced meat, with the method of the invention comprises, in operative sequence, a first treatment station provided with microwave heating means, hot air generating means and pressure control means for quickly heating the minced meat under a pressure increasing from atmospheric pressure to an overpressure which prevents liquid evaporation; a second treatment station provided with microwave heating means and pressure control means for further heating the minced meat up to a sterilization temperature and under constant overpressure for preventing liquid evaporation; a third treatment station provided with cooling means and pressure control means for cooling the minced meat under a pressure gradually decreasing to the atmospheric pressure; advancement lines provided at each of said stations to operatively cooperate for advancing along a treatment path the meat to be treated; and conveyance elements for supporting said meat during advancement along said treatment path, said conveyance elements being adapted to reflect microwaves generated by said microwave heating means and to allow liquids to drip off the treated meat

BRIEF DESCRIPTION OF THE DRAWINGS

Further characteristics will become apparent and evident from the detailed description of the method and of the corresponding apparatus according to the invention, illustrated only by way of non-limitative example in the accompanying drawings, wherein:

FIG. 4 is a schematic side view of the apparatus for carrying out the method according to the invention;

FIG. 5 is a perspective view of a tray used in the apparatus according to the invention;

FIG. 6 is a sectional view of the tray of FIG. 5.

DESCRIPTION OF THE PREFERRED EMBODIMENT

Figure 1:
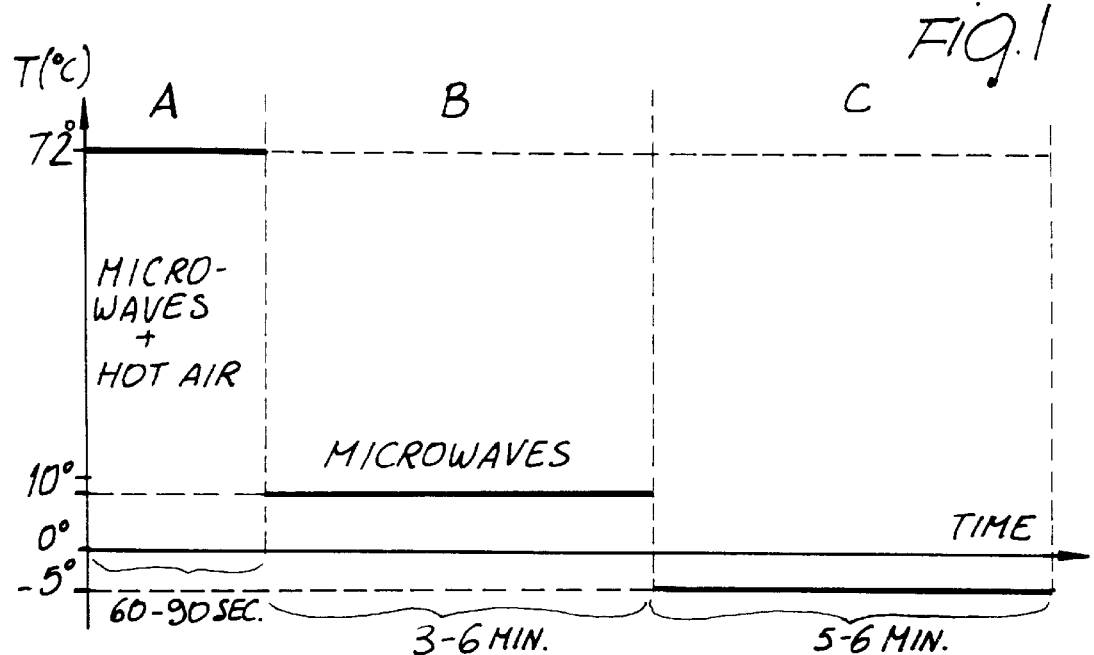
FIG. 1 is a diagram which plots the temperature variation in the stations of the apparatus for carrying out the method for sanitizing minced meat according to the invention.
Figure 2:
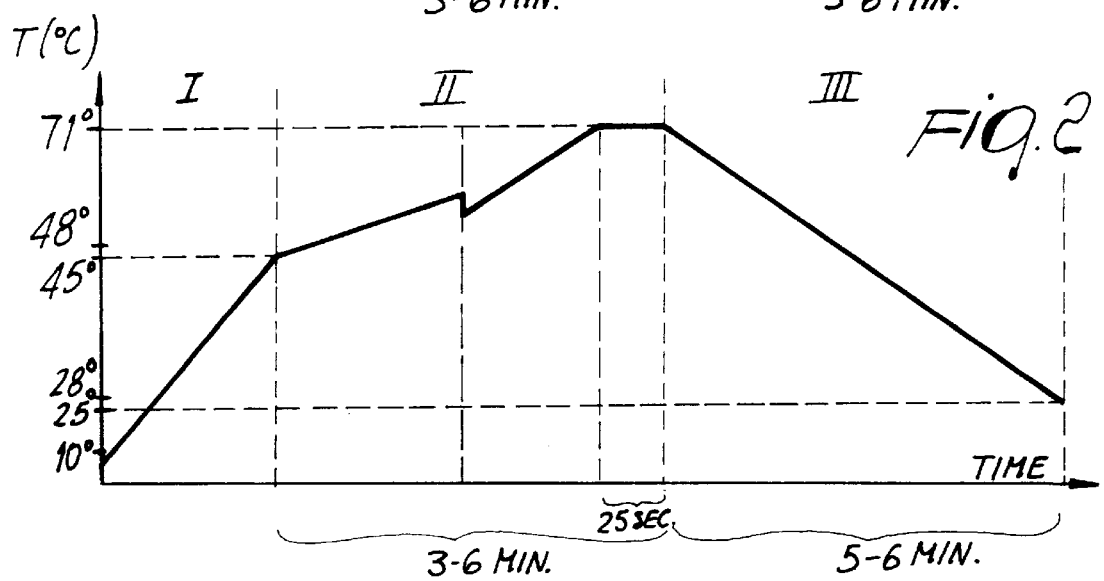
FIG. 2 is a diagram showing the temperature variation of the product during the steps of the method according to the invention.
Figure 3:
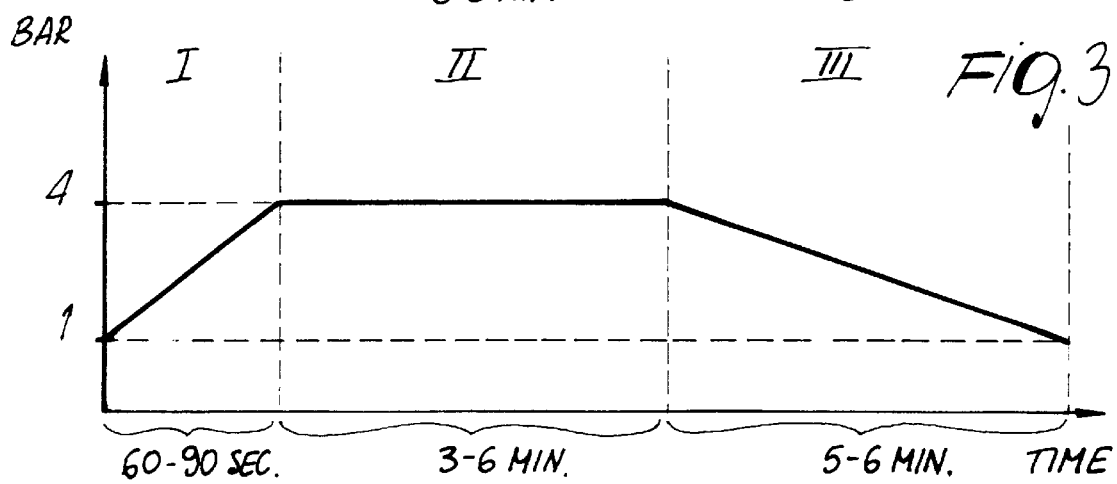
FIG. 3 is a diagram of the pressure variation in the stations of the apparatus during the method steps according to the invention.

With particular reference to the above figures, the reference signs A, B and C designate the first, second and third stations of the apparatus 1, in which the respective steps I, II and III of the method for sanitizing minced meat according to the invention are performed.

The first step I consists in taking minced meat, compacted in the form of a flattened meatball P, with a diameter between 80 and 160 mm and a thickness between 6 and 13 mm, and in quickly heating it by means of microwaves and hot air and at an increasing pressure in the station A.

Said step I entails quick heating from 3° C. to 45–48° C. by means of microwaves and hot air at 72° C., with a pressure which rises up to 4 bar and a duration between 60 and 90 seconds.

The hot air sanitizes the product at its surface, whilst the microwaves quickly heat the product mass to the temperature of 45–480° C. The meat so remains red without undergoing significant liquid lost and fat melting.

In the second step II, the preheated product enters the station B which is provided with pressure control means and cooling means to maintain its environmental treatment conditions at a constant pressure of 4 bar and at a temperature between 5 and 8° C.

The microwaves heat the product to 71° C., while the pressure contains evaporation and the low temperature protects the product against surface or border overheating.

To further avoid border overheating and to equalize the temperature on the surface of the products and throughout their entire mass, short pauses are provided in the delivery of the microwaves to allow transitory cooling of the meat. The pauses are alternated with microwave heating periods. Advantagoesuly several pauses of 20 seconds alternate with heating periods of 40 seconds. During such pauses the borders cool more quickly than the center of the products, an equalization of the product temperature being so achieved.

In said step II, the treatment time is rather long (between approximately 3 and 6 minutes), since the temperature to be reached is approached slowly, and not exceeded. The target temperature is thereafter maintained for at least 25 seconds.

During the third step III, the product P, treated at the sanitization temperature, is conveyed into the station C which is kept at a pressure of 4 bar and at a temperature between 0 and −5° C.

Whilst the product P cools, the pressure is decreased so that the expansion of the air from 4 to 1 bar causes a further decrease in temperature, producing thus a faster cooling.

Advantageously, in 5–6 minutes the product P reaches a temperature between 25 and 28° C.

The stations A, B and C of the apparatus 1 are independently operatable and are all provided with pressure control means, such as pressure seals and pumps and with air heating and respectively cooling means, for performing the corresponding steps I, II and III.

The low temperatures and the cooling in stations B and C, respectively during the steps II and III, are obtained by way of air cooled in suitable heat exchangers cooled with, for example, glycol or freon.

Conveyance elements, such as trays 5 are provided at the base of respective advancement lines 2, 3 and 4 for the transfer of the products P.

Each tray 5 is constituted by an upper supporting grille 6 and by a lower plate 7 for collecting the liquids possibly generated during the process and which are seeping through the products P under treatment, off their lower surface, and for the partial screening of the direct electromagnetic field arriving from the lower side of the products under treatment.

Advantageously, the plate is made of a heat resistant, microwave shielding/reflective material, such as food grade stainless steel.

It has been established that an efficient treatment, suitably reducing the fat melting effect, is obtained if the conveyance elements are such as to allow liquids and melted fats, possibly seeping through the treated hamburgers (products P), to drip off the lower surface thereof, and also such as to prevent exposure of said lower surface to a direct microwave energy field. The product supporting surface of a conveyance element must nevertheless provide a reflective surface for the microwaves.

Accordingly, the conveyance element may be metallic, preferably, as mentioned,advantageously of stainless steel, with a wide mesh (mesh size of 6), microwave-permeable fabric interposed under the product, allowing thus a space for liquid dripping and a space for the microwave field reflecting. In this manner some minimal microwave heating of the product from underneath, at its lower surface and part, is allowed as well.

It therefore ensues that the microwave electromagnetic field is to be advantageously generated and orientated, by means of generator elements 8, only from above of the products P.

Heat penetration only from the upper side of the products P delays the heating of the parts near the lower surface thereof and of the lower surface itself. The lower part of the product mass near the lower surface is thus allowed, in the first place, to absorb dripping liquids and fats. The heating of such lower part and surface occurs only in the last period of the treatment time, and product weight losses are accordingly further reduced.

The heating and subsequent cooling time periods which are selected as the most rapid possible for an efficient sanitizing treatment ensure better organoleptic properties.

The power levels of the microwaves used during the treatment steps I and II are advantageously in the range of 30–35 W/kg.

It has been established that a critical temperature threshold, at which at least a partial unwanted "cooking" takes place (i.e. at least a partial but significant melting of the fats and an already perceivable change in the organoleptic properties as compared with the raw meet state) in the ground beef meat, as generally used for the hamburgers, may be as low as 72° C.

Accordingly, for approaching a treatment temperature which is very close to the cooking temperature, and for obtaining practically the same effective temperature level all throughout the product mass under treatment, it is necessary to take cautionary measures for a strict control of the operations, as explained above, to avoid the total or partial cooking of the product with consequent disadvantageous colour changing and weight loss (a few degrees, such as 2 to 3° C., are sufficient to produce an unwanted product cooking).

In fact, by merely heating under a certain temperature level a meat product, or by repeated rapid heatings (HTST), even under a certain overpressure, the advantages of the method according to the invention cannot be achieved.

The treatment time was also seen to be critical for meat oxidation, i.e. too long times increase the risk of a colour change from the natural red meat colour.

In order to reduce liquid evaporation from the product under treatment, which may begin at temperatures as low as 50–60° C., the process is performed under overpressure, advantageously at 4 bar (and, accordingly, in an oxygen-rich environment), this also being helpful to avoid the "oxidation" of the meat during the treatment time.

A tray 5 is transferred from one step to the next so as to ensure the integrity of each of the products P thereon; once it has reached the unloading station 9, which is arranged downstream of the station C, the tray 5 is sent along a transfer line 10, where it is washed and disinfected for reusal, before reaching the loading station 11, which is arranged upstream of the station A.

The preferred dimensions for a tray 5 are, by way of indication:

length=1,500 mm width=to that of the forming machine

The process is fully automated and continuous.

At the station 11, a tray 5 is loaded by the forming machine with the products P, enters the apparatus 1, advances through the stations A–C, exits, and eventually returns along the transfer line 10 to the loading position after appropriate washing and the cycle is thereafter resumed.

The process is controlled by means of a PLC.

Timing, production, delivered power, pressures and temperatures are under the control of the PLC.

During the initial steps, IR thermometers monitor the temperatures of the product being processed.

The apparatus, according to the invention, has thus a simple construction, is reliable in use, has low energy consumption, and once the PLC is programmed, does not require special, highly qualified attendance.

EXAMPLES

The following examples illustrate the results achieved by applying in the apparatus described, the method according to the invention.

Example 1

Hamburgers have been treated, having the following parameters:

| a.Before the treatment. | |
| --- | --- |
| weight: | 70 g; |
| diameter: | 90 mm; |
| thickness: | 10 mm |
| total plate count (TPC): | $10^6$ cfu/g, of which |
| coliforms: | $10^3$ cfu/g, and |
| E. Coli: | $10^2$ cfu/g. |
| b.After the treatment. | |
| weight: | 65 g; |
| diameter: | 85 mm; |
| thickness: | 10 mm |
| total plate count (TPC): | $10^2$ cfu/g. |
| coliforms: | missing completely, and |
| E. Coli: | missing completely. |

Example 2

Hamburgers have been treated, having the following parameters:

| a.Before the treatment. | |
| --- | --- |
| weight: | 45 g; |
| diameter: | 90 mm; |
| thickness: | 6 mm |
| total plate count (TPC): | $10^6$ cfu/g, of which |
| coliforms: | $10^3$ cfu/g, and |
| E. Coli: | $10^2$ cfu/g. |
| b.After the treatment. | |
| weight: | 42 g; |
| diameter: | 85 mm; |
| thickness: | 6 mm |
| total plate count (TPC): | $10^2$ cfu/g. |
| coliforms: | missing completely, and |
| E. Coli: | missing completely. |

Example 3

Hamburgers have been treated, having the following parameters:

| a.Before the treatment. | |
| --- | --- |
| weight: | 120 g; |
| diameter: | 90 mm; |
| thickness: | 13 mm |
| total plate count (TPC): | $10^6$ cfu/g, of which |
| coliforms: | $10^3$ cfu/g, and |
| E. Coli: | $10^2$ cfu/g. |
| b.After the treatment. | |

-continued

| | |
|---|---|
| weight: | 111 g; |
| diameter: | 85 mm; |
| thickness: | 13 mm |
| total plate count (TPC): | $10^2$ cfu/g. |
| coliforms: | missing completely, and |
| E. Coli: | missing completely. |

The initial bacteria, total plate counts (TPC) were the same for all of the hamburgers treated and obviously do not depend on the dimensions of the products tested.

Furthermore, at the end of the treatment the bacterial counts showed that all of the colonies of coliforms and E. Coli were practically destroyed irrespective of the thickness and weight of the product.

The final colour for all of the treated products remained unchanged, the meat retaining eventually its original fresh, red colour.

The weight variation was less than 7.5% as compared with losses in weight of 15% and more for the products treated with the known sterilization/pasteurization techniques.

Moreover, all of the products treated according to the methods known in the art, with only the exception of the ones treated by gamma radiations, show colour alterations which are instead not occurring with the method of the invention.

In practice it has been found that the described invention achieves the intended aim and object.

The invention thus conceived is susceptible of numerous modifications and variations, all of which are within the scope of the inventive concept.

All the details may furthermore be replaced with other technically equivalent ones.

In practice, the materials employed, as well as the shapes and the dimensions, may be any according to the requirements without thereby abandoning the scope of the protection of the claims that follow.

The disclosures in Italian Pat. Appl. No. M098A000144 from which the instant document claims priority are herein incorporated by reference.

What is claimed is:

1. A method for sanitizing raw minced meat, comprising the steps of:
   quickly heating the minced meat by microwave heating and hot air under a pressure increasing from atmospheric pressure to an overpressure which prevents liquid evaporation;
   further heating the minced meat by microwave heating up to a sterilization temperature and under constant overpressure for preventing liquid evaporation; and
   cooling the minced meat under a gradually decreasing pressure;
   wherein the sterilization temperature is below a threshold temperature at which the meat changes organoleptic characteristics with respect to the raw meat state thereof.

2. The method of claim 1, wherein the first one of said steps comprises quick heating from 3° C. to 45–48° C. by way of microwave energy and hot air at 72° C., the overpressure reached being at the end of said first step of 4 bar.

3. The method of claim 2, wherein said first step has a duration of 60 to 90 seconds.

4. The method of claim 3, wherein the second one of said steps comprises maintenance of the meat under a constant overpressure of 4 bar and in an environment at a temperature of 5–8° C. while raising the temperature thereof by microwave heating up to a final temperature of 71° C., and eventually maintaining said final temperature for at least 25 seconds.

5. The method of claim 4, wherein said threshold temperature is 72° C. and said second step has a duration of 3 to 6 minutes.

6. The method of claim 4, wherein said second step comprises interruption of said microwave heating at least once during the raising of the temperature for allowing transitory cooling of the meat.

7. The method of claim 6, wherein the third one of said steps, the meat is cooled from 71° C. down to 25–28° C., in an environment maintained at a temperature between 0 and –5° C. and in which the pressure gradually decrease from 4 to 1 bar.

8. The method of claim 7, wherein said third step has a duration of 5–6 minutes.

9. The method of claim 1, comprising, before the first sanitizing step, a forming step consisting in compacting the minced meat so as to have a shape of flattened meatballs with a diameter between 80 and 160 mm and a thickness between 6 and 13 mm.

10. The method of claim 9, wherein, during said sanitizing steps the meatballs are laid flat on a supporting surface which is microwave reflective, and wherein the microwave heating is performed by way of an electromagnetic field having power levels in the range of 30–35 W/kg and which is generated from above the meatball.

11. The method of claim 10, wherein the meat heating is performed by way of a direct action of the microwave field generated from above the meatball and by indirect, reflected microwave radiation coming from said supporting surface, the indirect microwave radiation acting from underneath the meatball.

12. The method of claim 10, wherein the sanitizing steps are cyclically, automatically performed, under control of a PLC unit.

13. A method for sanitizing minced meat, comprising the steps of:
   quickly heating the minced meat by microwave heating and hot air under a pressure increasing from atmospheric pressure to an overpressure which prevents liquid evaporation;
   further heating the minced meat by microwave heating up to a sterilization temperature and under constant overpressure for preventing liquid evaporation; and
   cooling the minced meat under a gradually decreasing pressure;
   wherein the sterilization temperature is below 72° C.

14. An apparatus for sanitizing raw minced meat, comprising in operative sequence:
   a first treatment station provided with microwave heating means, hot air generating means and pressure control means for quickly heating the minced meat under a pressure increasing from atmospheric pressure to an overpressure which prevents liquid evaporation;
   a second treatment station provided with microwave heating means and pressure control means for further heating the minced meat up to a sterilization temperature and under constant overpressure for preventing liquid evaporation;
   a third treatment station provided with cooling means and pressure control means for cooling the minced meat under a gradually decreasing pressure;

advancement lines provided at each of said stations to operatively cooperate for advancing along a treatment path the meat to be treated; and conveyance elements for supporting said meat during advancement along said treatment path, said conveyance elements being adapted to reflect microwaves generated by said microwave heating means and to allow liquids to drip off the treated meat.

15. The apparatus of claim 14, wherein the microwave heating means are constituted by generator elements that generate a microwave electromagnetic field oriented from above and towards the treated meat.

16. The apparatus of claim 14, wherein said conveyance elements are constituted by a plurality of trays, each one of said trays comprising an upper supporting grille, on which the treated meat is supported, and a lower plate for collecting liquids dripping off said treated meat.

17. The apparatus of claim 16, wherein said lower plate is metallic, and the supporting grille is made of a microwave permeable fabric having a mesh size of 6, the grille being interposed between the meat and the lower plate so as to provide therebetween a space allowing the liquid dripping and reflection of the microwaves.

18. The apparatus of claim 15, wherein the generated electromagnetic field has power levels in the range of 30–35 W/kg.

19. The apparatus of claim 17, wherein said lower plate is made of a food grade stainless steel, which is adapted for being repeatedly sterilized for reuse.

20. The apparatus of claim 19, further comprising: a loading station, located upstream of said first treatment station, where the trays are loaded with meat for treatment; an unloading station located downstream of said third treatment station where said trays are unloaded; a transfer line, along which the unloaded trays are sterilized and transferred from said unloading to said loading station for reuse.

* * * * *